(12) United States Patent
von Flotow et al.

(10) Patent No.: US 8,091,833 B2
(45) Date of Patent: Jan. 10, 2012

(54) VIBRATION ISOLATION DEVICES AND ASSOCIATED SYSTEMS AND METHODS

(75) Inventors: Andreas Hubertus von Flotow, Hood River, OR (US); Tyler Patrick Horton, Hood River, OR (US)

(73) Assignee: Insitu, Inc., Bingen, WA (US)

( * ) Notice: Subject to any disclaimer, the term of this patent is extended or adjusted under 35 U.S.C. 154(b) by 401 days.

(21) Appl. No.: 12/390,301

(22) Filed: Feb. 20, 2009

(65) Prior Publication Data

US 2009/0218447 A1 Sep. 3, 2009

Related U.S. Application Data

(60) Provisional application No. 61/032,858, filed on Feb. 29, 2008.

(51) Int. Cl.
*B64C 1/00* (2006.01)
(52) U.S. Cl. .......................................... 244/131
(58) Field of Classification Search .................. 244/119, 244/120, 123.12, 131, 132
See application file for complete search history.

(56) References Cited

U.S. PATENT DOCUMENTS

| | | | |
|---|---|---|---|
| 2,886,991 A | 5/1959 | Parvin et al. | |
| 3,163,378 A | 12/1964 | Balke et al. | |
| 4,403,681 A | 9/1983 | Desjardins | |
| 4,405,101 A | 9/1983 | Carlson et al. | |
| 4,598,889 A * | 7/1986 | Remington | 244/87 |
| 4,799,631 A | 1/1989 | Humphries et al. | |
| 4,821,980 A | 4/1989 | Clausen et al. | |
| 5,065,959 A | 11/1991 | Bhatia et al. | |
| 5,152,478 A * | 10/1992 | Cycon et al. | 244/12.2 |
| 5,226,350 A * | 7/1993 | Cycon et al. | 74/665 F |
| 5,368,271 A | 11/1994 | Kiunke et al. | |
| 5,811,821 A | 9/1998 | Alexander et al. | |
| 6,036,163 A | 3/2000 | Yamada | |
| 6,056,237 A * | 5/2000 | Woodland | 244/3.15 |
| 6,290,183 B1 | 9/2001 | Johnson et al. | |
| 6,715,746 B2 | 4/2004 | Bachmeyer et al. | |
| 2003/0212478 A1 | 11/2003 | Rios | |
| 2003/0222194 A1 | 12/2003 | Platus | |

OTHER PUBLICATIONS

International Preliminary Report on Patentability for International Patent Application No. PCtT/US09/035320, Applicant: Insitu, Inc., mailed Sep. 10, 2010, 10 pages.
International Search Report and Written Opinion, International Application No. PCT/US09/35320, Applicant: Insitu, Inc., mailed Oct. 21, 2009, 11 pages.

* cited by examiner

*Primary Examiner* — Troy Chambers
(74) *Attorney, Agent, or Firm* — Perkins Coie LLP

(57) ABSTRACT

Vibration isolation devices and associated systems and methods are disclosed herein. In one embodiment, for example, an unmanned aircraft can include a fuselage having a first fuselage section and a second fuselage section adjacent to and at least approximately longitudinally aligned with the first fuselage section. The aircraft can also include at least one vibration isolation device coupling the first fuselage section to the second fuselage section. The vibration isolation device is translationally stiffer along a longitudinal axis than it is along a lateral and a vertical axis, and rotationally stiffer about a pitch and a yaw axis than it is about a roll axis.

24 Claims, 6 Drawing Sheets

VIBRATION ISOLATION DEVICES AND ASSOCIATED SYSTEMS AND METHODS

CROSS-REFERENCE TO RELATED APPLICATION

This application claims the benefit of U.S. Provisional Patent Application No. 61/032,858, filed Feb. 29, 2008, which is incorporated herein in its entirety.

TECHNICAL FIELD

The present disclosure is directed generally to vibration isolation devices and associated systems and methods. Several aspects of the present disclosure, more specifically, are directed toward vibration isolation devices for both aircraft and non-aircraft systems.

BACKGROUND

Unmanned aircraft or air vehicles (UAVs) provide enhanced and economical access to areas where manned flight operations are unacceptably costly and/or dangerous. For example, unmanned aircraft outfitted with remotely operated movable cameras and/or other surveillance payloads can perform a wide variety of surveillance missions, including spotting schools of fish for the fisheries industry, monitoring weather conditions, providing border patrols for national governments, and providing military surveillance before, during, and/or after military operations. The remotely controlled cameras on unmanned aircraft are typically carried by a gimbal system that controls and stabilizes movement of the camera during operation. The camera and gimbal system are, in turn, generally carried within a clear or at least partially clear housing positioned at or proximate to a nose portion of the aircraft fuselage.

This location offers excellent visibility for the camera during surveillance operations; however, the camera, the gimbal system, and the housing are highly susceptible to shock and vibrations produced by the engine and/or other components of the aircraft. Such vibrations are particularly difficult to isolate and/or dampen in piston-powered aircraft. If the vibrations are not adequately isolated, the vibrations can cause significant imaging problems (blurring, etc.). Moreover, excessive vibrations may also cause the highly complex and sensitive surveillance components to malfunction and/or become inoperable. In addition to the problems associated with the surveillance equipment, shocks and vibrations produced by the engine (or other aircraft components) can also negatively affect a number of other aircraft systems and/or payloads.

DETAILED DESCRIPTION

The present disclosure describes vibration isolation devices and associated systems and methods. Many specific details of certain embodiments of the disclosure are set forth in the following description and in FIGS. 1A-5 to provide a thorough understanding of these embodiments. Well-known structures, systems, and methods often associated with such systems have not been shown or described in detail to avoid unnecessarily obscuring the description of the various embodiments of the disclosure. In addition, those of ordinary skill in the relevant art will understand that additional embodiments may be practiced without several of the details described below.

Figure 1A:
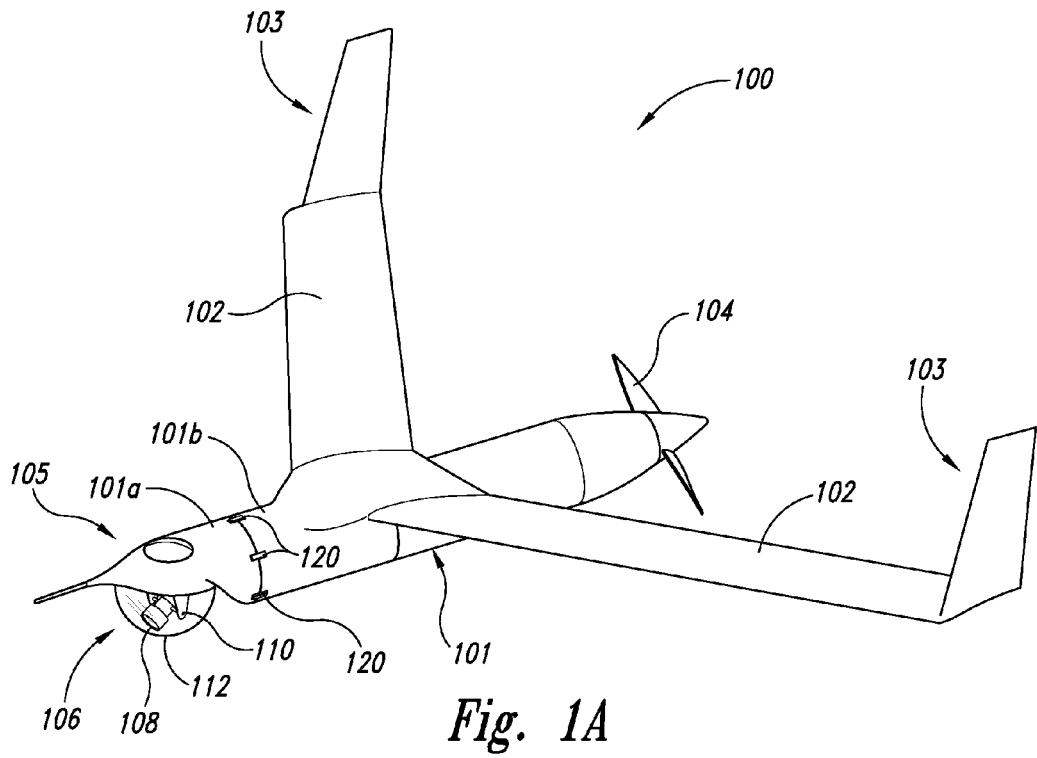
FIG. 1A is a partially schematic, isometric illustration of an unmanned aircraft having one or more vibration isolation devices configured in accordance with an embodiment of the disclosure.

FIG. 1A is a partially schematic, isometric view of an unmanned aircraft 100 having one or more passive vibration isolation devices or elements configured in accordance with an embodiment of the disclosure. The unmanned aircraft 100 can include a fuselage 101, a pair of wings 102 extending outwardly from the fuselage 101, and a propeller 104 positioned at the aft end of the fuselage 101 to propel the aircraft 100 during flight. Each wing 102 can include an upwardly extending winglet 103 for lateral stability and control. In the illustrated embodiment, the fuselage 101 is generally stiff and includes multiple, longitudinally aligned fuselage sections (two are shown as a first fuselage section 101a and a second fuselage section 101b) adjacent to each other and coupled together with one or more passive vibration isolation devices 120 (shown schematically). Although only three vibration isolation devices 120 are shown, it will be appreciated that a different number of vibration isolation devices 120 may be used to couple the first and second fuselage sections 101a and 101b together. Furthermore, the vibration isolation devices 120 may be used throughout the aircraft 100 to couple a variety of different components together (e.g., the engine to the adjacent fuselage section, various other adjacent fuselage sections to each other, various components within the propulsion system, etc.) and/or to secure a payload to a portion of the aircraft 100.

The first fuselage section 101a in the illustrated embodiment is a nose portion 105 of the aircraft 100 and includes a turret assembly 106 having a device 108 (e.g., an imaging device, camera, surveillance sensor, or other payload) carried by a gimbal system 110 (shown schematically). The gimbal 110 is configured to move the device 108 relative to the aircraft 100 to acquire and/or track a target located on the ground, at sea, or in the air. The device 108 and gimbal 110 can be positioned behind a surveillance dome or housing 112.

As described in detail below, the passive vibration isolation devices 120 can include clips or attachment features configured to secure components together, while minimizing vibration transfer from one component to another. The vibration isolation devices 120 in the embodiment illustrated in FIG. 1A, for example, are configured to secure the first fuselage section 101a to the second fuselage section 101b, while simultaneously minimizing and/or inhibiting vibration transfer from the second fuselage section 101b to the first fuselage section 101a and the turret assembly 106 carried by the first fuselage section 101a. In embodiments where the device 108 is a camera, for example, the vibration isolation devices 120 can reduce and/or eliminate imaging problems (e.g., blurring, etc.) associated with engine-induced or other flight-induced vibrations. In several embodiments, for example, the vibration reduction as a result of using the vibration isolation devices 120 is expected to be up to five orders of magnitude greater than conventional arrangements that do not include the devices 120. Further details regarding the vibration isolation devices 120 are described below with reference to FIGS. 1A-2C.

Figure 1B:
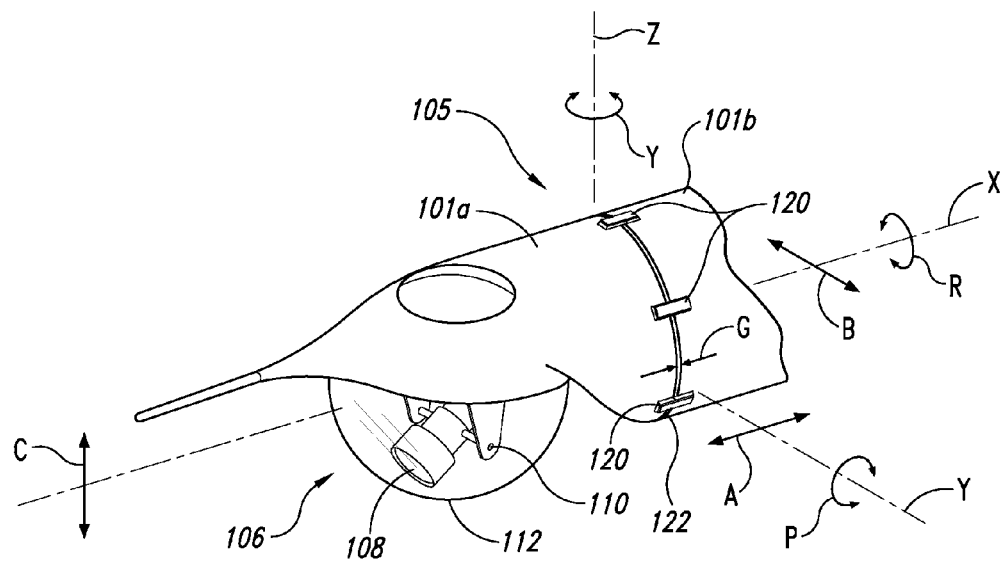
FIG. 1B is a partially schematic, isometric view of a nose portion of the aircraft of FIG. 1A.

FIG. 1B is a partially schematic, isometric view of a nose portion of the aircraft 100 of FIG. 1A. As is known in the art, there are six degrees of freedom or axes associated with movement of the aircraft 100 and its components (e.g., the first fuselage section 101a, the second fuselage section 101b, etc.). More specifically, the aircraft 100 and it components can have three translational degrees of freedom (i.e., three linear axes) and three rotational degrees of freedom (i.e., three moment axes). For purposes of illustration, the six degrees of freedom are all relative to the three mutually orthogonal axes X, Y, and Z. The X-axis, for example, is generally parallel with a longitudinal axis of the fuselage 101. The three translational degrees of freedom, for example, include longitudinal or forward/aft movement along the X-axis (as identified by the arrow A and referred to herein as the "longitudinal axis"), lateral or side-to-side movement along the Y-axis (as identified by the arrow B and referred to herein as the "lateral axis"), and vertical movement along the Z-axis (as identified by the arrow C and referred to herein as the "vertical axis"). The three rotational degrees of freedom include pitch movement about the Y-axis (as identified by the arrow P, roll movement about the X-axis (as identified by the arrow R), and yaw movement about the Z-axis (as identified by the arrow Y). The pitch, roll, and yaw movement accordingly define three moment axes (referred to herein as the "pitch axis," the "roll axis," and the "yaw axis," respectively)

In one particular aspect of the embodiment shown in FIG. 1B, the individual vibration isolation devices 120 are configured to be "stiff" so as to effectively restrict and/or inhibit movement relative to three axes (e.g., one translational degree of freedom or linear axis and two rotational degrees of freedom or moment axes), while being "soft" or allowing some movement in the other three axes (e.g., two translational degrees of freedom or linear axes and one rotational degree of freedom or moment axis) to isolate vibrations. More specifically, each vibration isolation device 120 is configured to be "stiff" with respect to (a) movement along the longitudinal axis (as shown by the arrow A), (b) pitch movement about the Y-axis (as shown by the arrow P), and (c) yaw movement about the Z-axis (as shown by the arrow Y). In addition, each vibration isolation element 120 is configured to be "soft" with respect to (a) movement along the lateral axis (as shown by the arrow B), (b) movement along the vertical axis (as shown by the arrow C), and (c) roll movement about the X-axis (as shown by the arrow R). In one specific embodiment, for example, each vibration isolation device 120 is configured to be translationally stiffer along the longitudinal axis than it is along both the lateral and vertical axes, and rotationally stiffer about the pitch and yaw axes then it is about the roll axis. In another particular embodiment, each vibration isolation device 120 is configured to be translationally softer along the lateral and vertical axes than it is along the longitudinal axis, and rotationally softer about the roll axis than it is about the pitch and yaw axes.

Figure 1C:
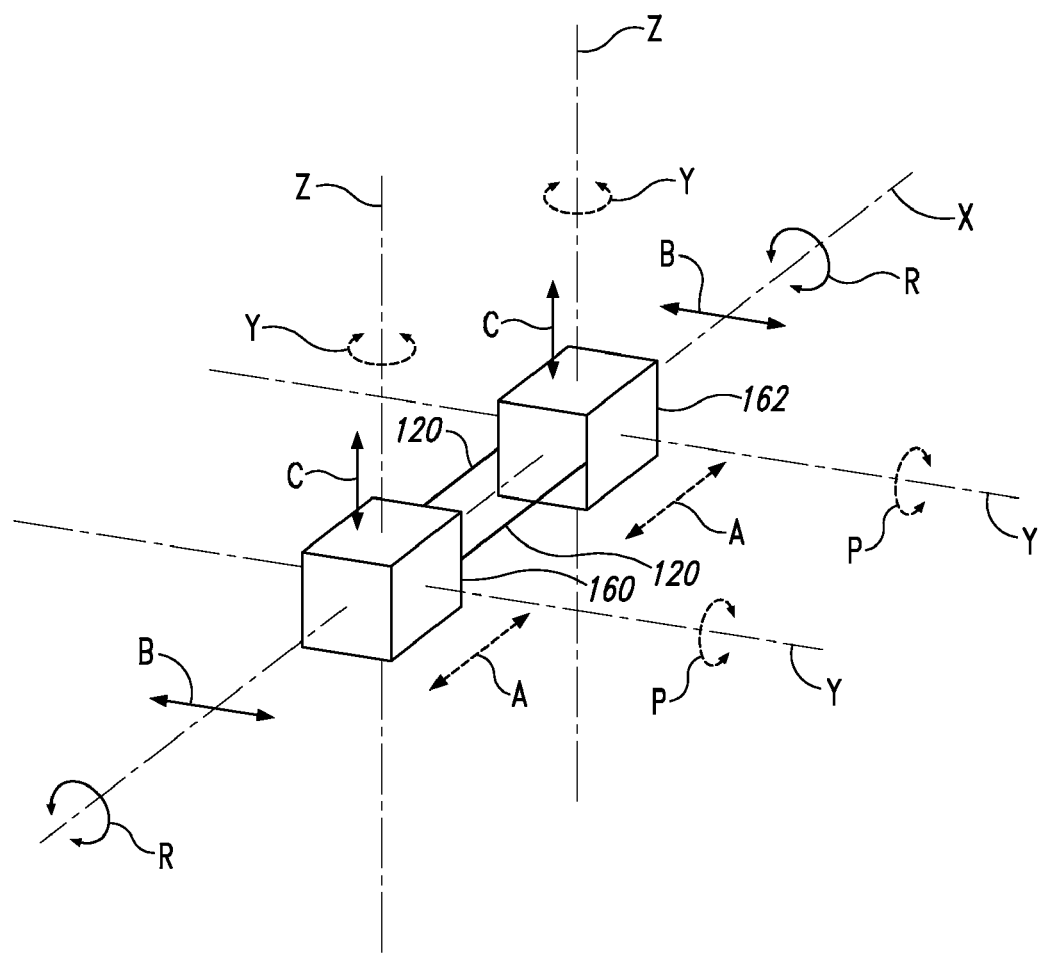
FIG. 1C is a schematic, isometric illustration of two components coupled together with one or more vibration isolation devices configured in accordance with an embodiment of the disclosure.

FIG. 1C is a schematic, isometric illustration of two components 160 and 162 (shown schematically) arranged relative to each other and coupled together with the vibration isolation devices 120 (shown schematically). The two components 160 and 162 can include the first and second fuselage sections 101a and 101b of FIGS. 1A and 1B, an engine and an adjacent fuselage section, an imaging device or camera and the gimbal to which the imaging device is attached, a payload and a corresponding adjacent structure of aircraft, or any of a wide variety of other components that may be coupled together.

For purposes of illustration, many aspects of FIG. 1C are simplified in order to more particularly illustrate how the vibration isolation devices 120 restrict/allow movement relative to the three translation and three rotational degrees of freedom. For example, the translational/rotational axes in which movement is restricted are shown in dashed lines, and the translational/rotational axes in which movement is allowed are shown in solid lines. More specifically, as discussed previously, the vibration isolation devices 120 are configured to (a) resist or inhibit relative movement between the first and second components 160 and 162 with respect to the longitudinal axis (shown by the arrow A), the pitch axis (shown by the arrow P), and the yaw axis (shown by the arrow Y), and (b) allow relative movement between the first and second components 160 and 162 with respect to the lateral axis (shown by the arrow B), the vertical axis (shown by the arrow C), and the roll axis (shown by the arrow R).

Referring back to FIG. 1B, the vibration isolation devices 120 allow the first and second fuselage sections 101a and 101b to translate laterally and vertically relative to each other during operation (offsetting the central axes of the two sections 101a and 101b, but preserving the direction cosines of the central axes in the defined coordinate system). The vibration isolation devices 120 also allow relative rotation of the first and second fuselage sections 101a and 101b with respect to each other about the X-axis (i.e., roll as shown by the arrow R), but inhibit and/or prevent angular motion (i.e., pitch or yaw) that would tend to "kink" the system and create a relative angle between the respective longitudinal axes of the two fuselage sections 101a and 101b. The vibration isolation devices 120 are further configured to inhibit and/or prevent excessive compression and/or extension of the individual vibration isolation devices 120 (i.e., movement along the longitudinal axis). This is particularly important during launch operations when large forces are transmitted to the aircraft 100 in the direction of the longitudinal axis.

In another particular aspect of the embodiment shown in FIG. 1B, the individual vibration isolation devices 120 are removable features configured to be releasably attached to the respective first and second fuselage sections 101a and 101b to mate the two sections together. The vibration isolation devices 120, for example, can be installed with the respective fuselage sections 101a and 101b using suitable fasteners (e.g., screws, bolts, etc.). In other embodiments, however, one or more of the vibration isolation devices 120 may be installed with the respective fuselage sections 101a and 101b using generally permanent securement methods (e.g., welding, adhesives, etc.). In still other embodiments, one or more of the vibration isolation devices 120 may be installed with the respective fuselage sections 101a and 101b using releasable latches or cam assemblies.

In the embodiment illustrated in FIGS. 1A and 1B, multiple vibration isolation devices 120 (only three are shown) are arranged generally symmetrically about the circumference of the fuselage 101. In other embodiments, however, the vibration isolation devices 120 can have a different arrangement around the fuselage 101 and/or a different number of vibration isolation devices 120 may be used to secure the first and second fuselage sections 101a and 101b together. In embodiments in which the vibration isolation devices 120 are used to secure other types of components together and/or secure a payload to a portion of the aircraft 100, any suitable number of vibration isolation devices 120 may be used. Moreover, although the vibration isolation devices 120 in the illustrated embodiment are installed externally on the fuselage 101, in other embodiments the vibration isolation devices 120 may be at least partially embedded in the fuselage 101 or may be installed internally within the fuselage 101.

In still another particular aspect of the embodiment illustrated in FIGS. 1A and 1B, the first fuselage section 101a is spaced apart from the second fuselage section 101b by a gap G. The gap G in the illustrated embodiment is approximately 5 mm. In other embodiments, however, the gap G can have a different dimension. In several embodiments, a compressible or elastomeric material 122 (e.g., foam, rubber, etc.) can be positioned in the gap G between the first and second fuselage sections 101a and 101b. The compressible material 122, for example, can be a generally ring-like component sized to fit within the gap G to provide damping for the first and second fuselage sections 101a and 101b. In other embodiments, the compressible material 122 may be an integral portion of one or both of the fuselage sections 101a and 101b. The compressible material 122 can also seal the gap G and provide environmental protection for the internal aircraft components proximate to the gap G. The compressible material 122 is an optional component that may not be included in some embodiments.

Figure 2A:
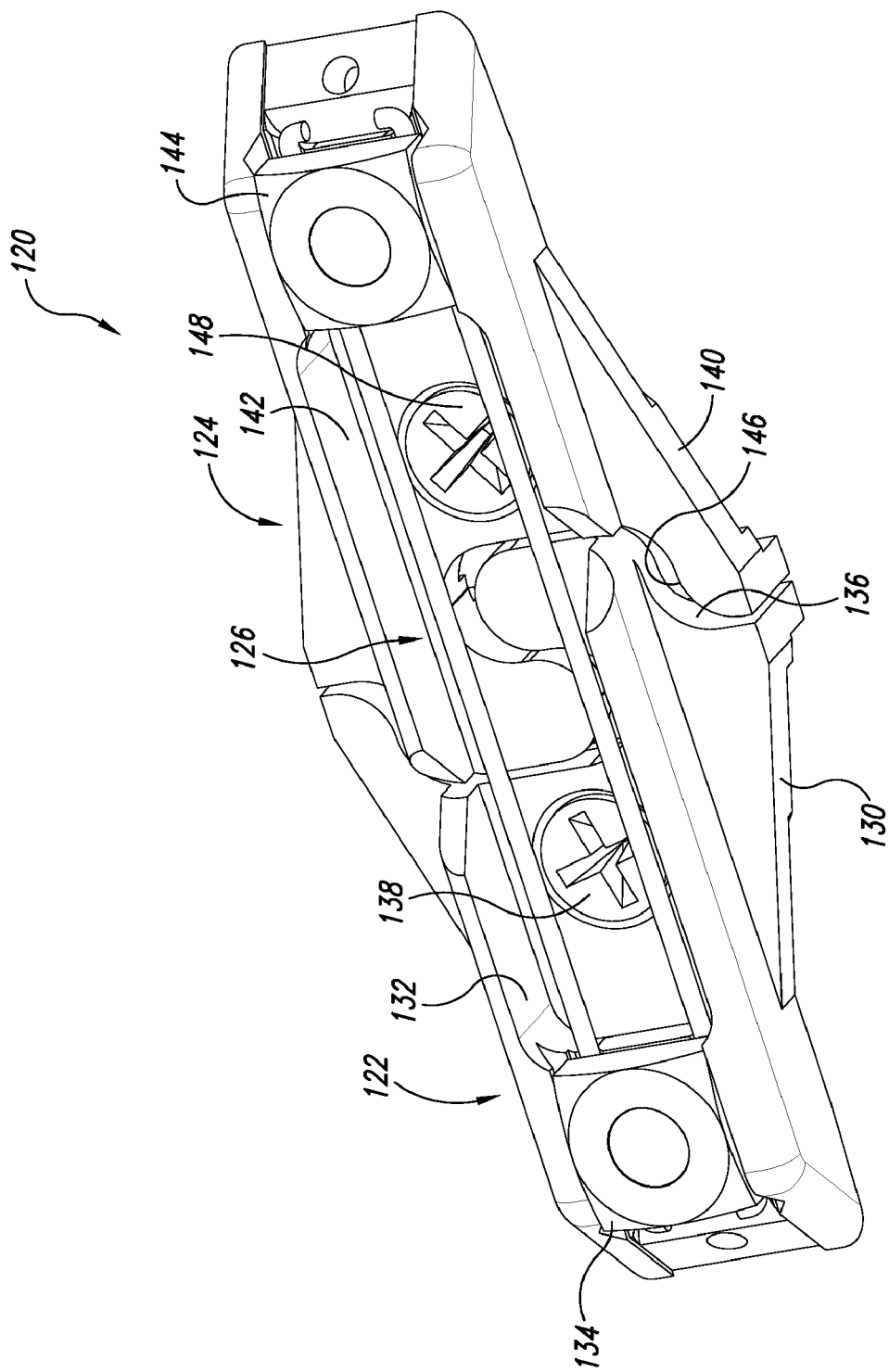
FIG. 2A is an isometric view of a vibration isolation device configured in accordance with an embodiment of the disclosure.

FIG. 2A is an isometric view of a vibration isolation device 120 before installation with the aircraft 100. The vibration isolation device 120 includes a first member or plate 122 and a second member or plate 124. The first member 122 and the second member 124 are discrete components positioned adjacent to each other and operatively coupled together with a tension member 126. The first member 122 includes a first base 130, a first channel 132 configured to receive a corresponding portion of the tension member 126, and a first clamping plate 134 configured to engage the tension member 126. The first base 130 includes a non-linear first mating surface 136 configured to mate with or otherwise engage a corresponding mating surface of the second member 124. Further details regarding the two mating surfaces are described below with reference to FIG. 2C. The first base 130 also includes a first fastener or attachment feature 138 (e.g., a screw, etc.) configured to secure the first member 122 to the corresponding component (e.g., the first fuselage section 101a—FIG. 1B).

The second member 124 of the vibration isolation device 120 includes a second base 140, a second channel 142 configured to receive the other portion of the tension member 126, and a second clamping plate 144 configured to engage the tension member 126. As mentioned above, the second base 140 also includes a non-linear second mating surface 146 configured to mate with the first mating surface 136 of the first member 122. The second base 140 also includes a second fastener or attachment feature 148 (e.g., a screw, etc.) configured to secure the second member 124 to the corresponding component (e.g., the second fuselage section 101b—FIG. 1B).

Figure 2B:
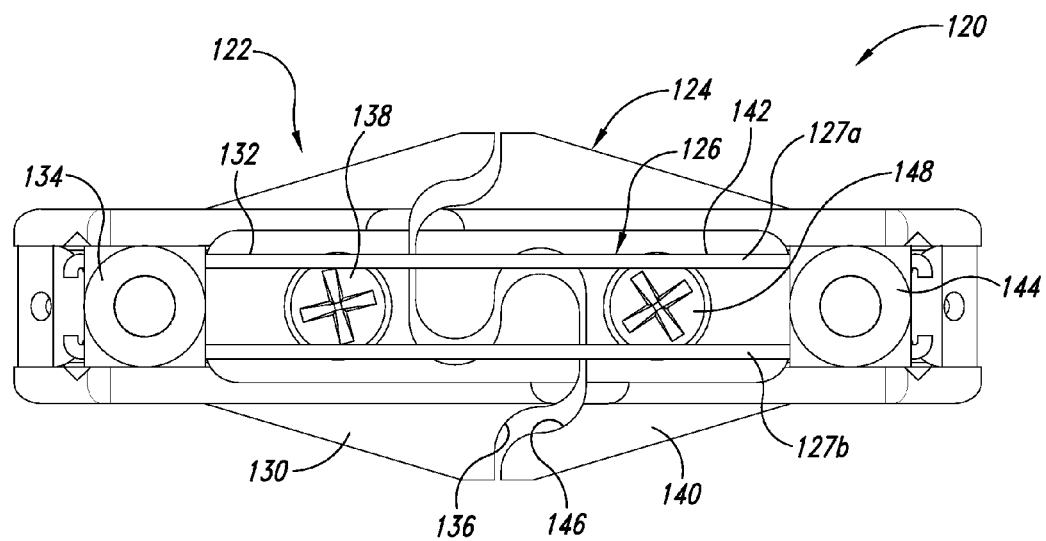
FIG. 2B is a top plan view of the vibration isolation device of FIG. 2A.

FIG. 2B is a top plan view of the vibration isolation device 120 of FIG. 2A. As best seen in FIG. 2B, the tensioning member 126 includes a first wire 127a and a second wire 127b extending between and operably coupling the first member 122 to the second member 124. The first and second wires 127a and 127b are secured to the respective first and second members 122 and 124 with the first and second clamping plates 134 and 144, respectively. In the illustrated embodiment, for example, the first and second clamping plates 134 and 144 include generally square nuts engaged with the respective first and second bases 130 and 140. In other embodiments, however, the first and second clamping plates 134 and 144 may have a different configuration and/or include different features. In still other embodiments, the tensioning member 126 may include a different number of wires and/or the tensioning member 126 may include different tensioning components in addition to, or in lieu of, the first and second wires 127a and 127b.

In the illustrated embodiment, the first and second wires 127a and 127b are composed of a high tensile strength stainless steel (e.g., 300-series stainless steel). In other embodiments, however, the first and second wires 127a and 127b may be composed of other suitable materials having the desired material properties. The first and second bases 130 and 140 are composed of aluminum. In other embodiments, however, the first and second bases 130 and 140 may be composed of other suitable materials. The material selection, for example, can be based, at least in part, on the components that will be mated or joined together with the vibration isolation device 120 and the desired isolation characteristics.

Figure 2C:
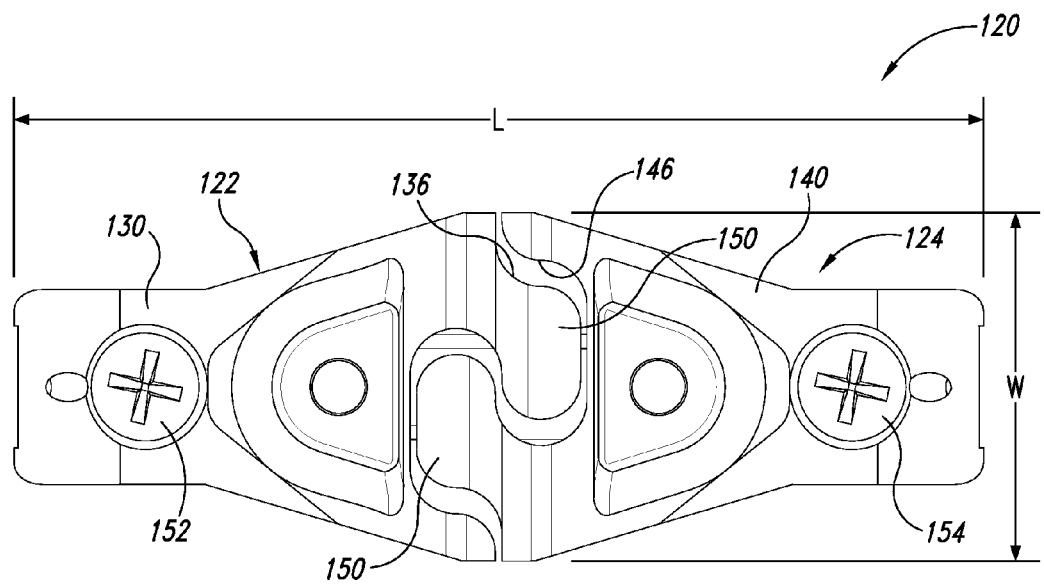
FIG. 2C is a bottom plan view of the vibration isolation device of FIG. 2A.

FIG. 2C is a bottom plan view of the vibration isolation device 120 of FIG. 2A. As best seen in FIG. 2C, the first and second mating surfaces 136 and 146 each include a serpentine path that defines, at least in part, one or more interlocking fingers 150. During periods of high loads on the vibration isolation device 120 (e.g., launch operations), the interlocking finger(s) 150 can be used to mechanically limit movement between first and second members 122 and 124 (and the corresponding first and second aircraft components to which the first and second members 122 and 124 are attached). The interlocking fingers 150 can accordingly minimize or limit the loads on the tensioning member 126, which may not be configured not to withstand such excessive loads. In other embodiments, however, the first and second mating surfaces 136 and 146 may have other configurations. In several embodiments, for example, the first and second mating surfaces 136 and 146 may be generally linear surfaces that do not include the interlocking fingers 150.

As also best seen in FIG. 2C, third and fourth fasteners 152 and 154 (e.g., screws) extend through the first and second bases 130 and 140, respectively, and are positioned to engage the respective first and second clamping plates 134 and 144 (FIG. 2B). In other embodiments, the third and fourth fasteners 152 and 154 may have another configuration. In still other embodiments, the third and fourth fasteners 152 and 154 may be omitted and the first and second clamping plates 134 and 144 (FIG. 2B) may be connected to the respective first and second bases 130 and 140 using other suitable attachment mechanisms.

In the illustrated embodiment, the vibration isolation device 120 has a length L of about 3 inches and a width W of about 1 inch. The dimensions of the vibration isolation device 120 are based, at least in part, on the particular components to which the vibration isolation device 120 will be attached and the desired vibration isolation characteristics of the device 120. Accordingly, in other embodiments, the dimensions of the vibration isolation device 120 can vary significantly from the dimensions of the device 120 of FIGS. 2A-2C.

Figure 3:
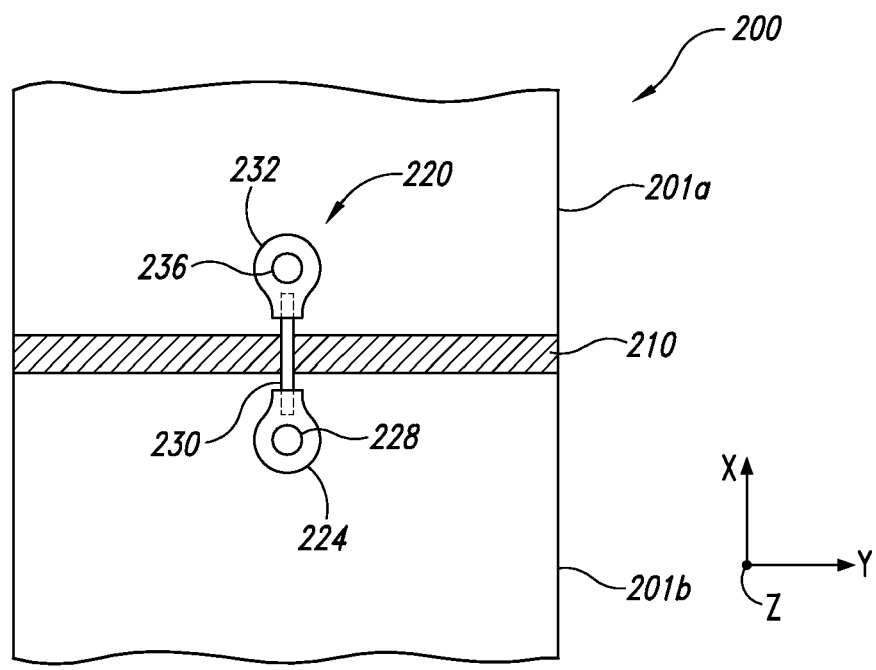
FIG. 3 is a partially schematic view, top plan view of a portion of an aircraft fuselage having one or more vibration isolation devices configured in accordance with another embodiment of the disclosure.

FIG. 3 is a partially schematic, top plan view of a portion of an aircraft fuselage 200 having one or more vibration isolation devices 220 configured in accordance with another embodiment of the disclosure. More specifically, the fuselage 200 includes a first fuselage section 201a coupled to a second fuselage section 201b using multiple vibration isolation devices 220 (only one is shown). The first and second fuselage sections 201a and 201b can be generally similar to the first and second fuselage sections 101a and 101b described above with reference to FIGS. 1A and 1B, or the first and second fuselage sections 201a and 201b can have a different configuration. In one embodiment, at least three vibration isolation devices 220 are used to couple the first and second fuselage sections 201a and 201b together. In other embodiments, however, a different number of vibration isolation devices 220 may be used. A rubber shear spring 210 is positioned between the first and second fuselage sections 201a and 201b and functions as a resilient member or structure between the respective sections.

In one aspect of the embodiment shown in FIG. 3, the individual vibration isolation devices 220 include a first member 222 coupled to the first fuselage section 201a and a second member 224 coupled to the second fuselage section 201b. The first and second members 222 and 224 include ball joints 226 and 228, respectively. The first and second members 222 and 224 are coupled together with a ball link assembly 230. In other embodiments, the individual vibration isolation devices 220 may have a different configuration and/or include different features.

The vibration isolation device 220 can function in generally the same way as the vibration isolation device 120 described above with reference to FIGS. 1A-1C, and can have the same many of the same features and advantages. For example, the vibration isolation device 220 is configured to be (a) "stiff" with respect to the longitudinal axis, the pitch axis, and the yaw axis; and (b) "soft" with respect to the lateral axis, the vertical axis, and the roll axis.

Figure 4:
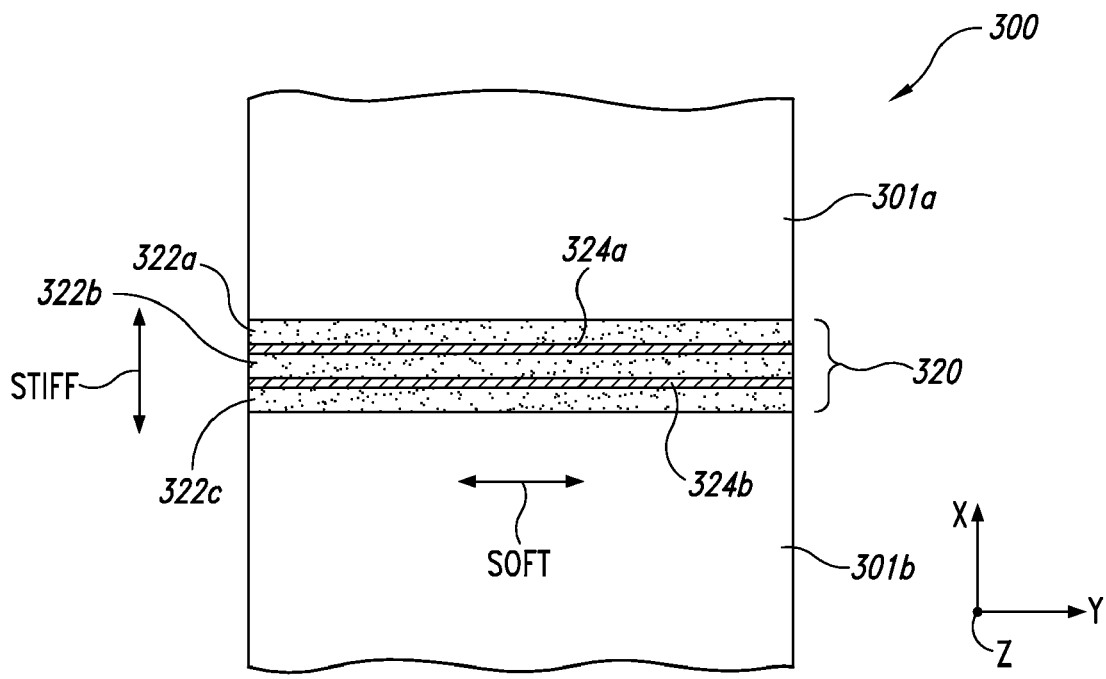
FIG. 4 is a partially schematic view of a portion of an aircraft fuselage having one or more vibration isolation devices configured in accordance with still another embodiment of the disclosure.

FIG. 4 is a partially schematic, top plan view of a portion of an aircraft fuselage 300 having a vibration isolation assembly 320 configured in accordance with still another embodiment of the disclosure. More specifically, the fuselage 300 includes a first fuselage section 301a coupled to a second fuselage section 301b with the vibration isolation assembly 320. The first and second fuselage sections 301a and 301b can be generally similar to the first and second fuselage sections 101 a and 101 b described above with reference to FIGS. 1A and 1B, or the first and second fuselage sections 301a and 301b can have a different configuration. The vibration isolation assembly 320 in this embodiment differs from the vibration isolation devices 120 and 220 described above in that the vibration isolation assembly 320 includes a multiple layers of different materials connected to and between the fuselage sections 301a and 301b, rather than a device having two discrete components connected to the respective fuselage sections 301a and 301 b and connected together with a tensioning member or link.

The vibration isolation assembly 320 includes multiple compressible (e.g., rubber shear) layers 322 (three are shown in the illustrated embodiment as layers 322a-c). The vibration isolation assembly 320 also includes constraining (e.g., steel) layers 324 (two are shown as layers 324a and 324b) between the individual compressible layers 322a-c. In other embodiments, a different number of compressible layers 322 and/or constraining layers 324 may be used. Moreover, the compressible layers 322 and/or constraining layers 324 may be composed of different types of materials than those described above.

The vibration isolation assembly 320 can function in generally the same way as the vibration isolation devices 120 described above with reference to FIGS. 1A-1C. For example, the vibration isolation assembly 320 is configured to be relatively "stiff" so as to inhibit movement relative to the same three axes (e.g., one translational degree of freedom axis and two rotational degrees of freedom) described previously, and relatively "soft" in the other three axes described above (e.g., two translational degrees of freedom and one rotational degree of freedom) to isolate vibrations.

Figure 5:
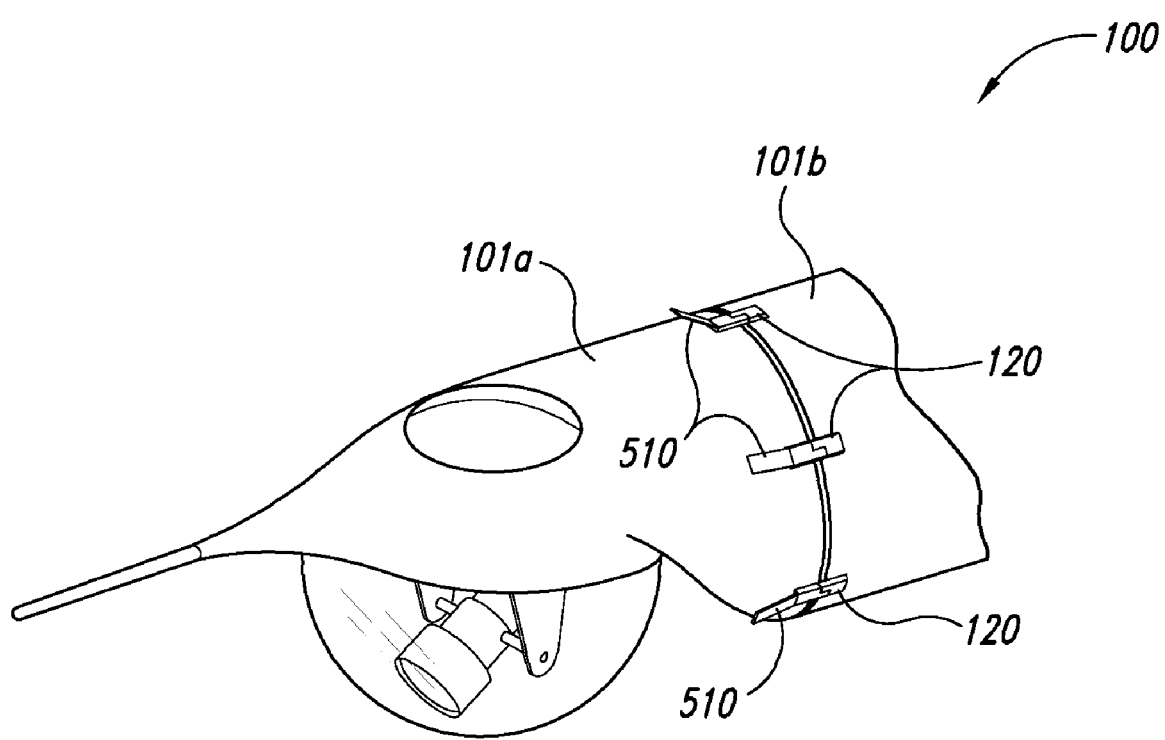
FIG. 5 is a partially schematic, isometric illustration of a nose portion of an aircraft having one or more vibration isolation devices configured in accordance with an yet embodiment of the disclosure.

From the foregoing, it will be appreciated that specific embodiments have been described herein for purposes of illustration, but that the disclosure encompasses additional embodiments as well. For example, the vibration isolation devices described above with reference to FIGS. 1A-4 may have different configurations and/or include different features. Referring to FIG. 5, for example, one or more vibration isolation devices 120 may further include a rope deflection assembly 510 attached to a forward portion of the respective vibration isolation devices 120. The rope deflection assembly 510 is configured to deflect a vertically-suspended capture line during landing operations of the aircraft 100 and prevent the capture line from becoming caught or otherwise inadvertently engaged with the vibration isolation devices 120. The rope deflection assembly 510 is an optional component that may not be included in some embodiments.

Specific elements of any of the foregoing embodiments can be combined or substituted for elements in other embodiments. For example, the vibration isolation devices or assemblies described in the context of specific aircraft systems can be implemented in a number of other aircraft or non-aircraft systems that include multiple components releasably coupled together and where vibration sensitive payloads are an issue (e.g., automotive applications, industrial applications, etc.). Certain aspects of the disclosure are accordingly not limited to aircraft systems. Furthermore, while advantages associated with certain embodiments of the disclosure have been described in the context of these embodiments, other embodiments may also exhibit such advantages, and not all embodiments need necessarily exhibit such advantages to fall within the scope of the disclosure. Accordingly, embodiments of the disclosure are not limited except as by the appended claims.

We claim:

1. An unmanned aircraft system, comprising:
    a fuselage having a first fuselage section and a second fuselage section adjacent to and at least approximately longitudinally aligned with the first fuselage section; and
    at least one vibration isolation device coupling the first fuselage section to the second fuselage section, wherein the vibration isolation device is—
        translationally stiffer along a longitudinal axis than it is along a lateral axis and a vertical axis; and
        rotationally stiffer about a pitch axis and a yaw axis than it is about a roll axis.

2. The unmanned aircraft system of claim 1 wherein the individual vibration isolation devices comprise:
    a first member attached to the first fuselage section with a first fastener;
    a second member attached to the second fuselage section with a second fastener; and
    a tensioning member connected to and extending between the first member and the second member.

3. The unmanned aircraft system of claim 2 wherein:
the tensioning member includes a first wire and a second wire;
the first member includes a first clamping plate engaged with a first end portion of each of the first and second wires; and
the second member includes a second clamping plate engaged with a second end portion of each of the first and second wires.

4. The unmanned aircraft system of claim 2 wherein:
the first member includes a non-linear first mating surface facing the second member; and
the second member includes a non-linear second mating surface configured to mate with the first mating surface, and wherein the first and second mating surfaces define, at least in part, one interlocking finger.

5. The unmanned aircraft system of claim 1, further comprising a rubber shear spring between the first and second fuselage sections, and wherein the individual vibration isolation devices comprises:
a first member attached to the first fuselage section, the first member including a first ball joint;
a second member attached to the second fuselage section, the second member including a second ball joint; and
a ball link connected to and extending between the first member and the second member.

6. The unmanned aircraft of claim 1 wherein the at least one vibration isolation device comprises:
two or more compressible layers in contact with and between the first and second fuselage sections, wherein the compressible layers are composed of a generally compressible material; and
a constraining layer between the individual compressible layers, wherein the constraining layer is composed of a generally rigid material.

7. The unmanned aircraft system of claim 1 wherein the first fuselage section is spaced apart from the second fuselage section by a gap, and wherein the vibration isolation device further comprises a generally compressible material between and in contact with the first fuselage section and the second fuselage section.

8. The unmanned aircraft system of claim 1 wherein multiple vibration isolation devices are arranged generally symmetrically about an outer circumference of the fuselage and positioned to couple the first fuselage section to the second fuselage section.

9. The unmanned aircraft system of claim 1 wherein:
the first fuselage section is a nose portion of the aircraft including a turret assembly and a surveillance payload carried by a gimbal system; and
the second fuselage section is immediately aft of the first fuselage section.

10. The unmanned aircraft system of claim 1, further comprising a rope deflection assembly carried by one or more vibration isolation devices.

11. The unmanned aircraft system of claim 1 wherein the aircraft is a piston-powered aircraft.

12. An aircraft system, comprising:
an unmanned aircraft having a fuselage and a pair of wings extending from the fuselage;
a first component carried by the aircraft;
a second component carried by the aircraft and positioned adjacent to the first component; and
a vibration isolation assembly coupling the first component to the second component, wherein the vibration isolation assembly is configured to (a) resist relative movement between the first and second components with respect to one translational degree of freedom and two rotational degrees of freedom, and (b) allow relative movement between the first and second components with respect to two translational degrees of freedom and one rotational degree of freedom.

13. The aircraft system of claim 12 wherein the vibration isolation assembly is configured to:
resist relative movement between the first and second components with respect to the longitudinal axis, the pitch axis, and the yaw axis; and
allow relative movement between the first and second components with respect to the lateral axis, the vertical axis, and the roll axis.

14. The aircraft system of claim 12 wherein the vibration isolation assembly comprises:
a first member attached to the first component;
a second member attached to the second component; and
a tensioning member connected to and extending between the first member and the second member.

15. The aircraft system of claim 14 wherein:
the first member includes a first base having a non-linear first mating surface, a first channel positioned to receive a portion of the tensioning member, and a first clamping plate positioned to engage the tensioning member, and wherein the non-linear first mating surface faces the second member; and
the second member includes a second base having a non-linear second mating surface configured to mate with the first mating surface, a second channel positioned to receive another portion of the tensioning member, and a second clamping plate positioned to engage the tensioning member, and wherein the first and second mating surfaces define, at least in part, one interlocking finger.

16. The aircraft system of claim 14 wherein:
the tensioning member includes a first wire and a second wire;
the first member includes a first clamping plate engaged with a first end portion of each of the first and second wires; and
the second member includes a second clamping plate engaged with a second end portion of each of the first and second wires.

17. The aircraft system of claim 12 wherein:
the first component is an engine carried by the aircraft; and
the second component is a fuselage section immediately adjacent to the engine.

18. The aircraft system of claim 12 wherein:
the first component is a payload carried by the aircraft; and
the second component is a portion of the aircraft immediately adjacent to the payload.

19. The aircraft system of claim 12 wherein the vibration isolation assembly is a removable feature configured to be releasably attached to the respective first and second components.

20. The aircraft system of claim 12 wherein the vibration isolation assembly is a generally non-removable feature fixedly attached to the respective first and second components.

21. The aircraft system of claim 12 wherein first component is spaced apart from the second component by a gap, and wherein the vibration isolation assembly further comprises a generally compressible material between and in contact with the first and second components.

22. An aircraft system, comprising:
an unmanned aircraft including a fuselage having (a) a first fuselage section including a nose portion with a turret assembly and a surveillance payload carried by a gimbal system, and (b) a second fuselage section immediately aft of and at least approximately longitudinally aligned with the first fuselage section; and a plurality of vibration isolation devices arranged generally symmetrically about an outer circumference of the fuselage and positioned to couple the first fuselage section to the second fuselage section, wherein each vibration isolation device is— translationally stiffer along a longitudinal axis than it is along a lateral axis and a vertical axes; and rotationally stiffer about a pitch axis and a yaw axis than it is about a roll axis; and wherein the individual vibration isolation devices include— a tensioning member connected to and extending between a first member attached to the first fuselage section and a second member attached to the second fuselage section, wherein the tensioning member includes a first wire and a second wire, wherein the first member including a first base having a non-linear first mating surface, a first channel, and a first clamping plate engaged with a first end portion of each of the first and second wires, and wherein the non-linear first mating surface faces the second member, and wherein the second member includes a second base having a non-linear second mating surface configured to mate with the first mating surface, a second channel positioned to receive another portion of the tensioning member, and a second clamping plate engaged with a second end portion of each of the first and second wires, and wherein the first and second mating surfaces define, at least in part, one interlocking finger.

23. The aircraft system of claim 22 wherein the vibration isolation devices are removable features configured to be releasably attached to the respective first and second fuselage sections and positioned to mate the two sections together.

24. The aircraft system of claim 22 wherein the vibration isolation devices are generally non-removable features secured to the respective first and second components and positioned to mate the two sections together.

* * * * *